(12) United States Patent
Doi et al.

(10) Patent No.: US 10,352,747 B2
(45) Date of Patent: Jul. 16, 2019

(54) THERMAL AIR FLOW-RATE SENSOR

(71) Applicant: Hitachi Automotive Systems, Ltd., Hitachinaka-shi, Ibaraki (JP)

(72) Inventors: Ryosuke Doi, Hitachinaka (JP); Yasuo Onose, Hitachinaka (JP); Masahiro Matsumoto, Tokyo (JP); Hiroshi Nakano, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 133 days.

(21) Appl. No.: 15/515,342

(22) PCT Filed: Jul. 24, 2015

(86) PCT No.: PCT/JP2015/071050
§ 371 (c)(1),
(2) Date: Mar. 29, 2017

(87) PCT Pub. No.: WO2016/051941
PCT Pub. Date: Apr. 7, 2016

(65) Prior Publication Data
US 2017/0234710 A1  Aug. 17, 2017

(30) Foreign Application Priority Data
Sep. 30, 2014  (JP) .................... 2014-199603

(51) Int. Cl.
*G01F 1/69* (2006.01)
*G01F 5/00* (2006.01)
(Continued)

(52) U.S. Cl.
CPC ............... *G01F 1/69* (2013.01); *G01F 1/68* (2013.01); *G01F 1/696* (2013.01); *G01F 5/00* (2013.01); *G01F 25/00* (2013.01)

(58) Field of Classification Search
CPC ..... G01F 1/69; G01F 5/00; G01F 25/00; G01F 1/696; G01F 1/68
See application file for complete search history.

(56) References Cited

U.S. PATENT DOCUMENTS

| 6,272,918 B1 | 8/2001 | Suetake |
| 2015/0135823 A1 | 5/2015 | Tokuyasu et al. |
| 2015/0300858 A1 | 10/2015 | Matsumoto et al. |

FOREIGN PATENT DOCUMENTS

| JP | 9-243413 A | 9/1997 |
| JP | 2004-205420 A | 7/2004 |

(Continued)

OTHER PUBLICATIONS

English machine translation for document JP2004226289.*
(Continued)

*Primary Examiner* — Daniel S Larkin
*Assistant Examiner* — Anthony W Megna Fuentes
(74) *Attorney, Agent, or Firm* — Crowell & Moring LLP

(57) ABSTRACT

The purpose of the present invention is to provide a thermal flow-rate sensor that is capable of self-diagnosis. Provided is a thermal flow-rate sensor provided with a semiconductor element that detects a flow rate and that is equipped with electrode pads for electrical conduction with the outside, wherein at least two of the electrode pads are provided, and other electrode pads proximate to the electrode pads are arranged and have an electric potential beyond the scope of output to be used at the time of flow rate detection.

6 Claims, 14 Drawing Sheets

(51) Int. Cl.
*G01F 25/00* (2006.01)
*G01F 1/696* (2006.01)
*G01F 1/68* (2006.01)

(56) References Cited

FOREIGN PATENT DOCUMENTS

| JP | 2004-226289 A | 8/2004 |
|---|---|---|
| JP | 2006-29792 A | 2/2006 |
| JP | 2014-1993 A | 1/2014 |
| JP | 2014-92414 A | 5/2014 |
| JP | 2015-90338 A | 5/2015 |

OTHER PUBLICATIONS

English machine translation for document JP2006029792.*
English machine translation for document JP2014092414.*
English machine translation for document JP2004205420.*
Extended European Search Report issued in counterpart European Application No. 15847068.2 dated Jun. 8, 2018 (ten (10) pages).
Japanese-language Office Action issued in counterpart Japanese Application No. 2016-551610 dated Sep. 19, 2017 with English translation (Four (4) pages).
International Search Report (PCT/ISA/210) issued in PCT Application No. PCT/JP2015/071050 dated Nov. 10, 2015 with English translation (Two (2) pages).
Japanese-language Written Opinion (PCT/ISA/237) issued in PCT Application No. PCT/JP2015/071050 dated Nov. 10, 2015 (Four (4) pages).
European Third Party Observation issued in counterpart European Application No. 15847068.2 dated Sep. 26, 2018 (three(3) pages).

* cited by examiner

| SHORT-CIRCUIT TERMINAL 1 | SHORT-CIRCUIT TERMINAL 2 | OUTPUT VOLTAGE [V] | SELF-DIAGNOSIS |
|---|---|---|---|
| GND1 | S1 | −1.7 TO −1.5 | POSSIBLE |
| S1 | GNDH | −1.7 TO −1.5 | POSSIBLE |
| GNDH | S2 | 1.7 TO 1.9 | POSSIBLE |
| S2 | VCC1 | −1.7 TO −1.5 | POSSIBLE |

THERMAL AIR FLOW-RATE SENSOR

TECHNICAL FIELD

The present invention relates to a sensor that detects a physical quantity, in particular relates to a thermal flow rate sensor that detects an intake airflow rate of an internal combustion engine.

BACKGROUND ART

As for a flow rate sensor detecting an intake air amount that is provided in an intake air passage of an internal combustion engine of a motor vehicle or the like, thermal sensors have conventionally been prevailing because they can directly detect a mass air quantity.

Recently, attention has been given to an air flow rate element in which after a resistor and an insulation layer film are accumulated on a silicon substrate using a semiconductor micromachining technology, a part of the silicon substrate is removed by a solvent such as KOH, and a thin film section (diaphragm) is formed, because the air flow rate element includes a high-speed responsiveness and is capable of a backward flow detection.

On the other hand, inmost cases, a semiconductor circuit element such as an LSI and a microcomputer is used in order to drive the air flow rate element by heating using a heater, where the semiconductor circuit element and the air flow rate element are directly connected at each electrode pad via a gold wire or the like or they are electrically connected to the electrode pad and a substrate wiring section via a ceramic wiring substrate that supports the semiconductor circuit element and the air flow rate element or the like.

On the other hand, recent requirements for motor vehicle components include a functional safety. With the functional safety, when, for example, any sort of abnormality occurs in sensors or actuators that make up a fuel injection system of an engine, an engine control unit (ECU) stores and detects the occurrence of the abnormality and turns on a warning indicator of an instrument panel or the like in order to let the driver know the occurrence of the abnormality, so that the driver recognizes that there is an abnormality in some part of the motor vehicle components, stops the driving of the vehicle for early repair, exchange of parts, or the like, and returns the vehicle to a safe state. This can prevent a dangerous traveling in which the driver continues a normal driving even in a state in which a motor vehicle component has an abnormality. The most important thing about the functional safety is whether each component (a sensor, for instance) diagnoses whether a current state is normal or abnormal and, if there is an abnormality, it can accurately transfer it to the ECU. In other words, it is whether a single component includes a function to output a failure signal by itself when an abnormality occurs in a part of the single component. In general, this is called a self-diagnosis function. Examples of these technologies include the one described in the patent literature 1.

CITATION LIST

Patent Literature

PTL 1: Japanese Patent Application Laid-Open No. 2014-1993

SUMMARY OF INVENTION

Technical Problem

When a self-diagnosis is carried out, one of the failure modes of a thermal flow rate sensor may be a short circuit between adjacent electrode pads. For instance, a method to detect short circuit using a comparator is commonly employed in a case where short circuit occurs between an electric power source potential and a ground potential. However, short circuit between midpoint potentials when abridge circuit is configured and its midpoint potential is removed has not been taken into consideration so far.

A short circuit occurring between electrode pads may be caused via a void in a resin. This problem will be explained in detail using FIG. 3 and FIG. 4.

As presented in FIG. 3, a thermal flow rate sensor 50 is inserted into an air intake duct 40. The thermal flow rate sensor 50 includes an air flow rate detection element 10 and an LSI 70, which is a drive circuit. In a configuration of FIG. 3, the air flow rate detection element 10 is adhered on a ceramic substrate and connected with an electrical wiring layer 65 in the ceramic substrate using a gold wire 90 as for electrical conduction. Similarly the LSI 70 is also adhered on the ceramic substrate and connected with an electrical wiring in the ceramic substrate using the gold wire 90 as for electrical conduction. In this way, the air flow rate detection element 10 and the LSI 70 are electrically connected. In the configuration described above, air flowing inside the air intake duct is partially taken into the thermal flow rate sensor and flows on the air flow rate detection element 10, and thus flow rate detection is made possible.

In addition, an electrical conduction portion of the air flow rate detection element 10 will be explained using FIG. 4. Since the element is directly exposed to engine intake air as described above, a variety of materials such as water, sulfur gas, and oil scatter onto the element. It is common that a resin seal 100 is provided so as to protect an electrode pad section 30 and a gold wire section 90 from such materials.

On the other hand, a void 101 may be formed inside the resin seal. Formation of a void itself is not any problem at all as a product. However, since this seal section is exposed to a very harsh environment as engine intake air as described previously, a case is assumed in which a liquid (gas) material such as water is collected in a void over a long period of time.

What is a problem now is, as presented in FIG. 4, a void that is formed across adjacent gold wires. If an electrically conductive material such as water is collected in the void in this state, a problem of short circuit occurs between the adjacent gold wires.

On the other hand, the patent literature 1 presents an example of arrangement of electrode pads of an element of a thermal flow rate sensor. However, the patent literature 1 is insufficient in terms of consideration for short circuit between adjacent pads described above. More specifically, there is a case in which short circuit occurs between adjacent midpoint potential electrode pads. This problem will be explained using FIG. 5 to FIG. 9.

FIG. 5 is a drawing that presents a simplified illustration of a wiring section of an element of a drive circuit of a common thermal flow rate sensor that is described in the patent literature 1. A flow rate detection bridge is configured with a bridge circuit that controls a heat resistor (heater) 21 and temperature measuring resistors 22 and 23 that are arranged in the upstream and the downstream of the heater. FIG. 6 is a drawing that presents a simplified illustration of an arrangement of the electrode pads that are described in the patent literature 1. FIG. 7 presents an output of the thermal flow rate sensor when this circuit works normally. When the circuit works normally, Vmax and Vmin, which correspond to a maximum value Qmax of the flow rate and a minimum value Qmin of the flow rate, respectively, are output. In contrast, FIG. 8 presents output voltage when a short circuit occurs between S2 and V2MA terminals of FIG. 6. Since S2 and V2MA are both electrical potentials corresponding to midpoint potentials of the bridge circuit, output voltages (S1-S2) slightly change compared with a normal case. While FIG. 8 presents a change in a negative direction, there may be a change in a positive direction. The greatest problem here is that changed properties are within the output range that is used normally presented in FIG. 7. In this case, even if the property changes as in FIG. 8, the ECU on the engine control side is not capable of recognizing that it is an abnormality, and hence the engine control may be carried out with the original property presented in FIG. 7.

In addition, the greatest effect on the property after short circuit is a case in which a short circuit occurs between S1 and S2, which are flow rate output signals. In this case, as presented in FIG. 9, since a short circuit has occurred, a voltage V0, which corresponds to a zero output, is constantly output regardless of the air flow rate. Also in this case, the greatest problem here is that changed properties are within the output range that is used normally presented in FIG. 7. In this case, even if the property has changed as in FIG. 9, the ECU on the engine control side is not capable of recognizing that it is an abnormality, and hence the engine control may be carried out with the original property presented in FIG. 7.

As given above, not only the patent literature 1 but also other conventional arts have not considered an output change when a short circuit occurs between electrode pads that correspond to mainly adjacent midpoint potentials. Depending on the short circuit pattern, an output value after short circuit occurs falls within an output range that is used normally and the ECU described above is not capable of recognizing that the component state is an abnormality. As a result, there has been a possibility that a dangerous driving state is caused by carrying out an engine control using a signal that contains a great error.

An object of the present invention is to provide a thermal flow rate sensor that is capable of carrying out a self-diagnosis.

Solution to Problem

The above problem can be solved by, for instance, a thermal flow rate sensor that is provided with electrode pads for electrical conduction with the outside and includes a semiconductor element that detects a flow rate, in which two or more of the electrode pads are provided, and an electrode pad that has an electrical potential outside the output range used at a time of flow rate detection is arranged in an electrode pad that is adjacent to the electrode pad.

Advantageous Effects of Invention

According to the present invention, a thermal flow rate sensor that is capable of carrying out a self-diagnosis even when a short circuit occurs between pads that are adjacent to each other in an electrode pad provided in an element that detects a flow rate can be provided.

DESCRIPTION OF EMBODIMENTS

An embodiment according to the present invention will be hereinafter described.

First Embodiment

Figure 5:
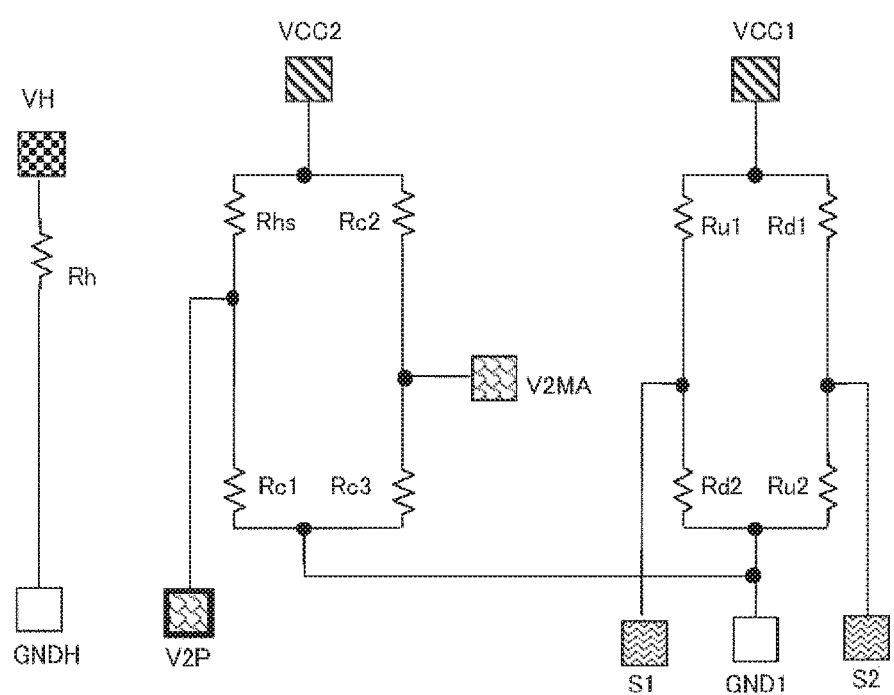
FIG. 5 is an illustration of an embodiment of a conventional thermal flow rate sensor.
Figure 6:
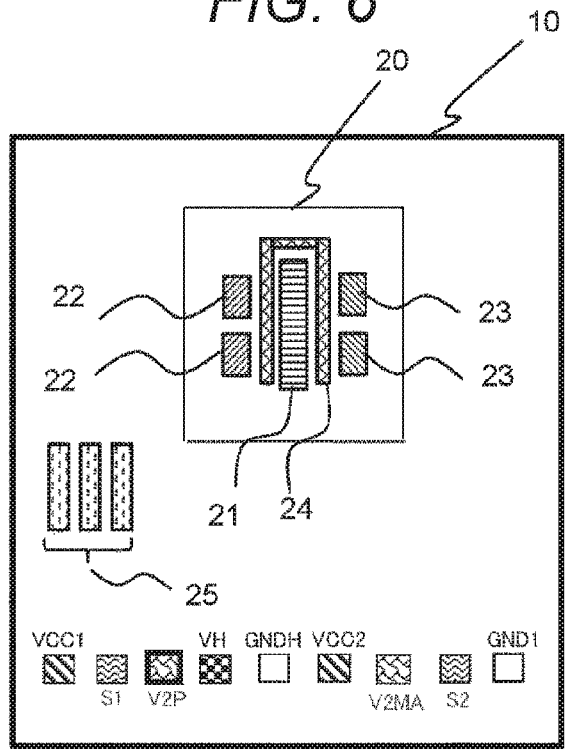
FIG. 6 is an illustration of an embodiment of a conventional thermal flow rate sensor.
Figure 7:
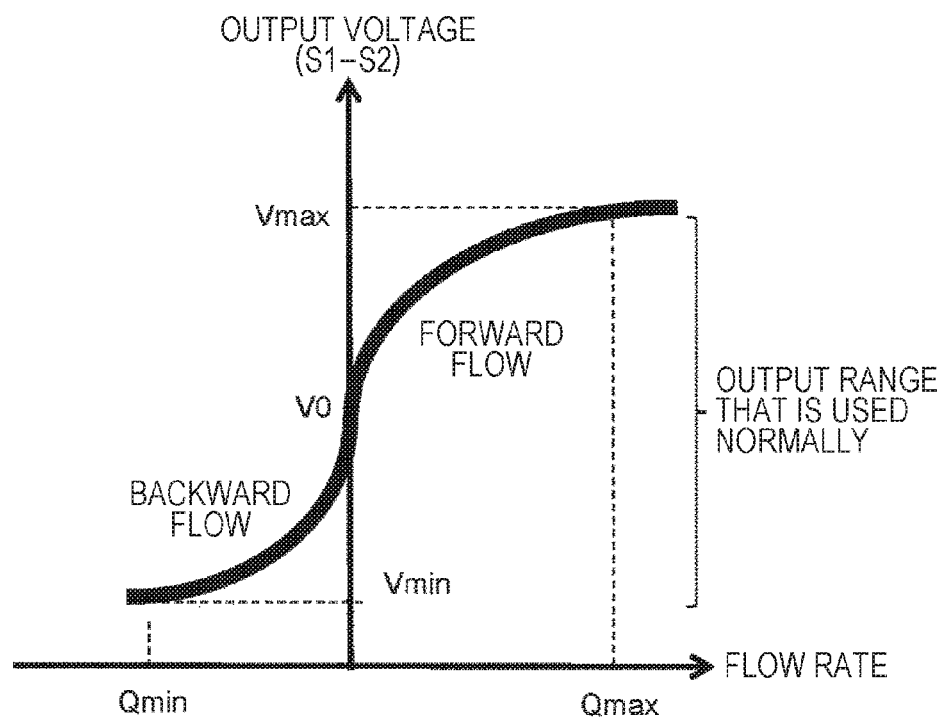
FIG. 7 is an illustration of an embodiment of a conventional thermal flow rate sensor.

A production method of the air flow rate detection element 10 will be described with reference to the cross-section view presented in FIG. 5. An insulating oxide film 11 is formed on a silicon substrate 12, a resistance wiring layer 13 is formed on the insulating oxide film 11 formed on a silicon substrate 12, and patterning is provided by etching. The insulating oxide film 11 is further formed on it. After that, in order to obtain electrical conduction, a contact section is formed on an insulating oxide film of an upper layer by etching, an electrode wiring layer 14 made of aluminium or the like is formed on that, and, similarly, patterning is provided by etching, so that an electrode pad is formed. In the end, the silicon substrate is etched with KOH (potassium hydroxide) from the rear side, so that the silicon substrate is partially removed and a diaphragm section 20 is formed. This is a common production method of an air flow rate detection element.

Embodiments according to the present invention will next be described using FIG. 1 and FIG. 2. FIG. 2 presents a circuit diagram of the air flow rate element 10. This circuit includes a heat resistor Rh and a bridge circuit that is formed by upstream temperature measuring resistors Ru1 and Ru2 and downstream temperature measuring resistors Rd1 and Rd2. In addition, an arrangement of the resistors is presented in FIG. 1. A heat resistor is arranged in a central part of the diaphragm 20, and a temperature measuring resistor is arranged on an upstream side and a downstream side of it. This element and an LSI are electrically connected and, by applying a constant voltage from the LSI to between Rh-GNDH terminals, heat is applied and a temperature distribution is formed in the diaphragm section. Due to this, a difference in temperature between the upstream and the downstream is detected and the air flow rate can be measured.

Figure 1:
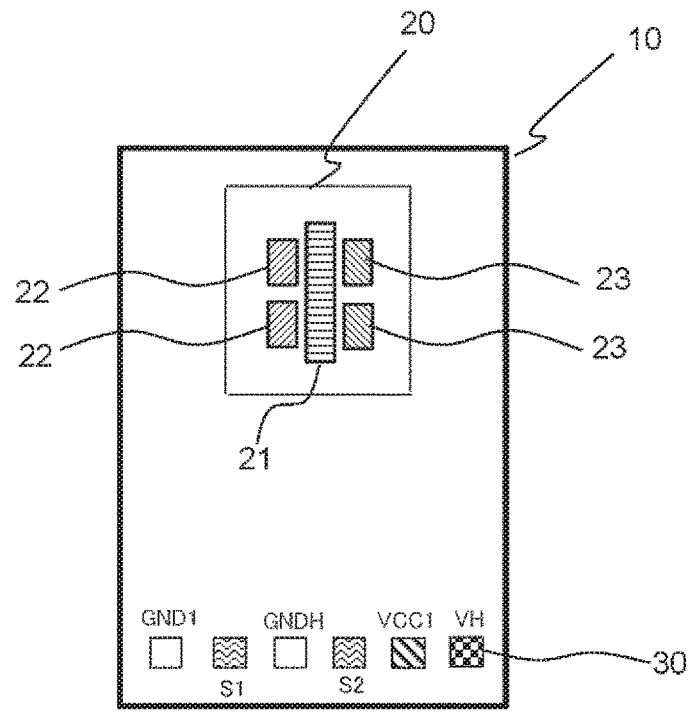
FIG. 1 is an illustration of an embodiment of a thermal flow rate sensor according to the present invention.
Figure 2:
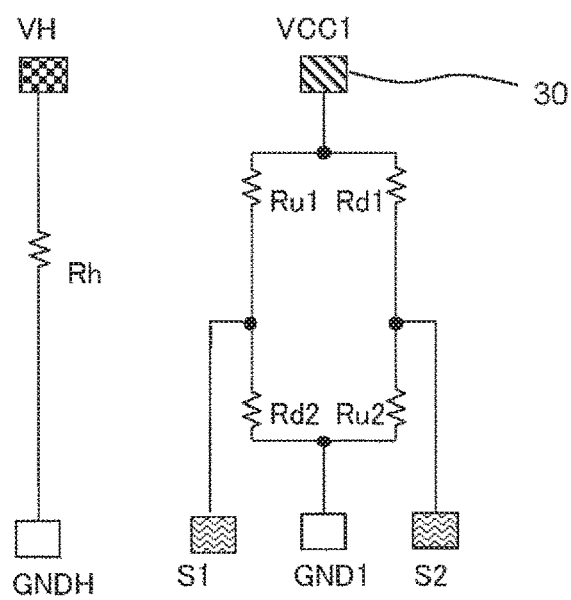
FIG. 2 is an illustration of an embodiment of the thermal flow rate sensor according to the present invention.
Figure 3:
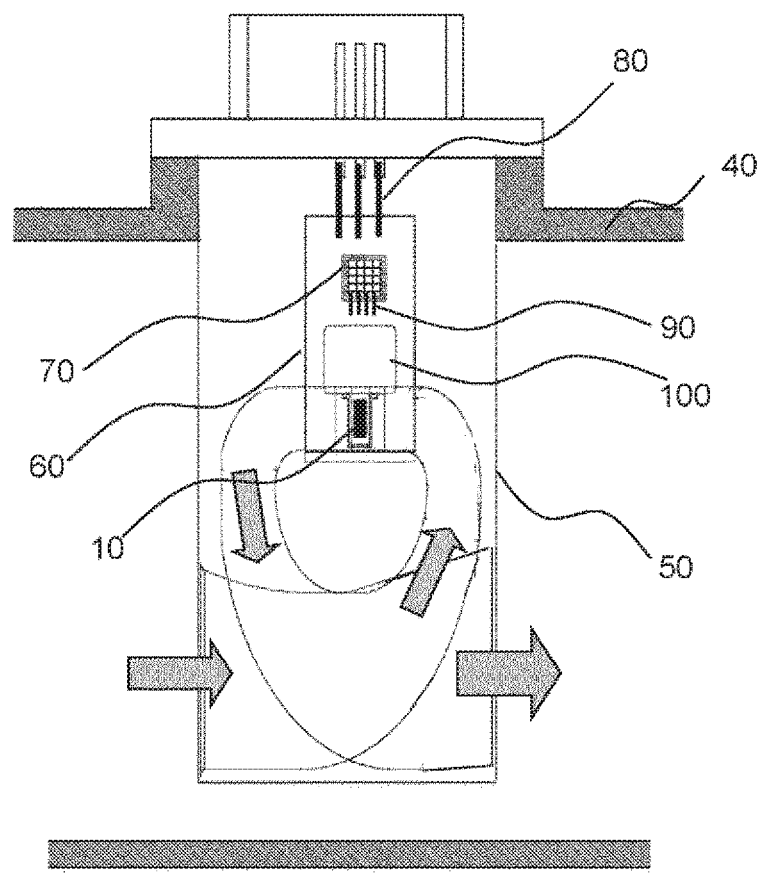
FIG. 3 is an outline illustration of the thermal flow rate sensor.
Figure 4:
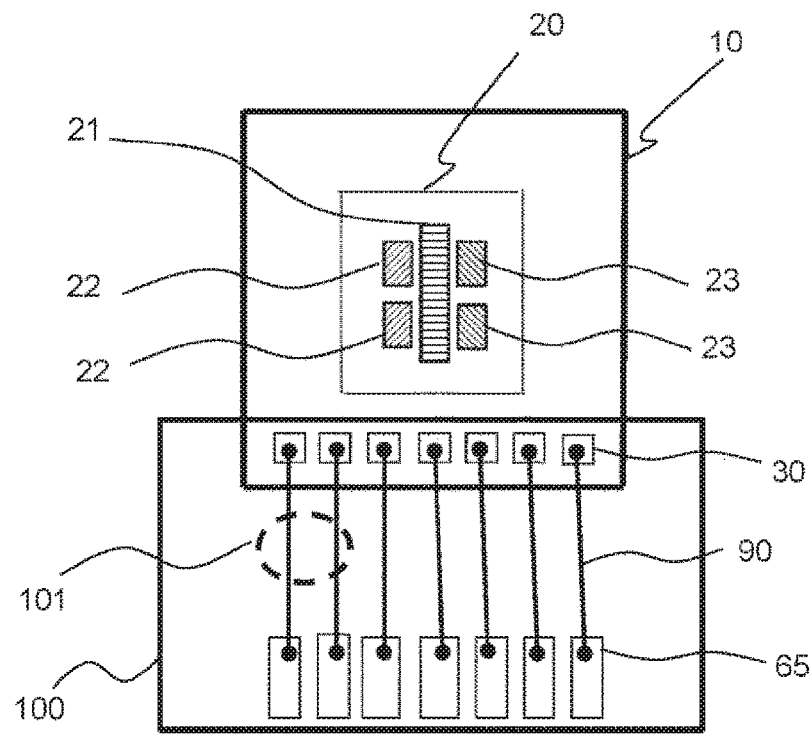
FIG. 4 is an illustration of an electrical connection of an air flow rate detection element.
Figure 11:
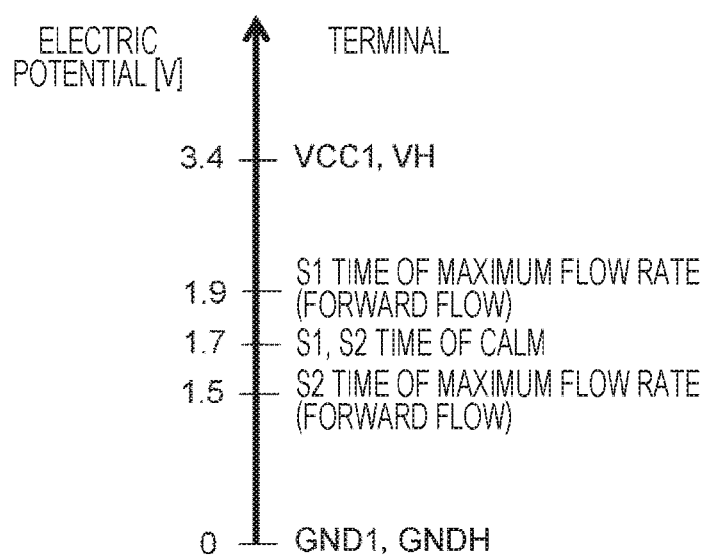
FIG. 11 is an illustration of an embodiment of the thermal flow rate sensor according to the present invention.
Figure 12:
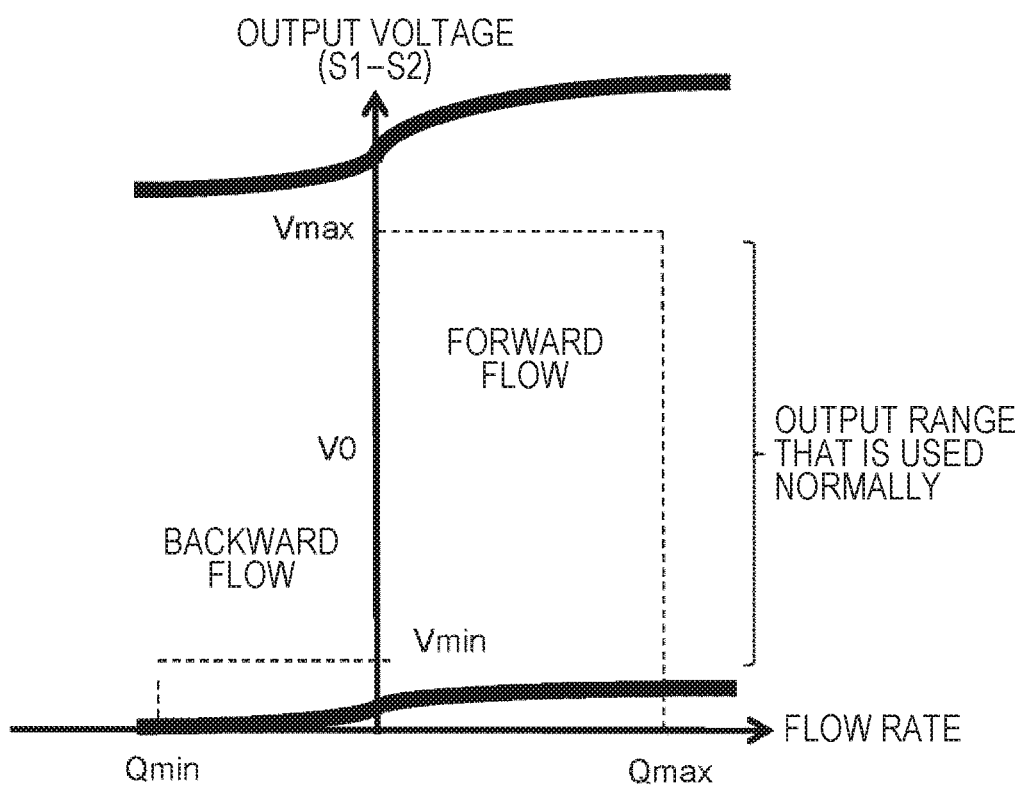
FIG. 12 is an illustration of an embodiment of the thermal flow rate sensor according to the present invention.

In addition, FIG. 1 presents an arrangement of an electrode pad 30 of each electrical potential presented in FIG. 2. These electrode pads are arranged so that an electrode pad adjacent to the electrode pads (S1 and S2) through which a flow rate signal is output becomes an electrode pad that has an electrical potential outside the output range used at the time of flow rate detection. FIG. 11 presents a truth value of a short circuit occurring between electrode pads adjacent to S1 and S2 in the arrangement described above. In addition, each electrical potential level used in this calculation is presented. Each value shows an electrical potential of a common thermal flow rate sensor, and, even in a case where the power supply voltage and the output range are different depending on each product, the table of truth value shows the same result. In addition, there is no problem as for a short circuit occurring between VH and VCC1 because the same electrical potential is set.

Thus, by employing the arrangement of the configuration of the present invention, the output value after short circuit as mentioned in the problem described above is out of the range used normally, and hence the thermal flowmeter can carry out a self-diagnosis and can accurately detect a product abnormality on the ECU side.

As above, the first embodiment can provide a thermal flow rate sensor that is capable of carrying out a self-diagnosis in all the cases where a short circuit occurs in adjacent electrode pads.

In addition, regardless of the circuit diagram of the present first embodiment, as long as at least the pads described above are provided, an advantageous effect of a self-diagnosis of the thermal flow rate sensor can be achieved if the arrangement relationship of the electrode pads meets the conditions described above.

Second Embodiment

Figure 13:
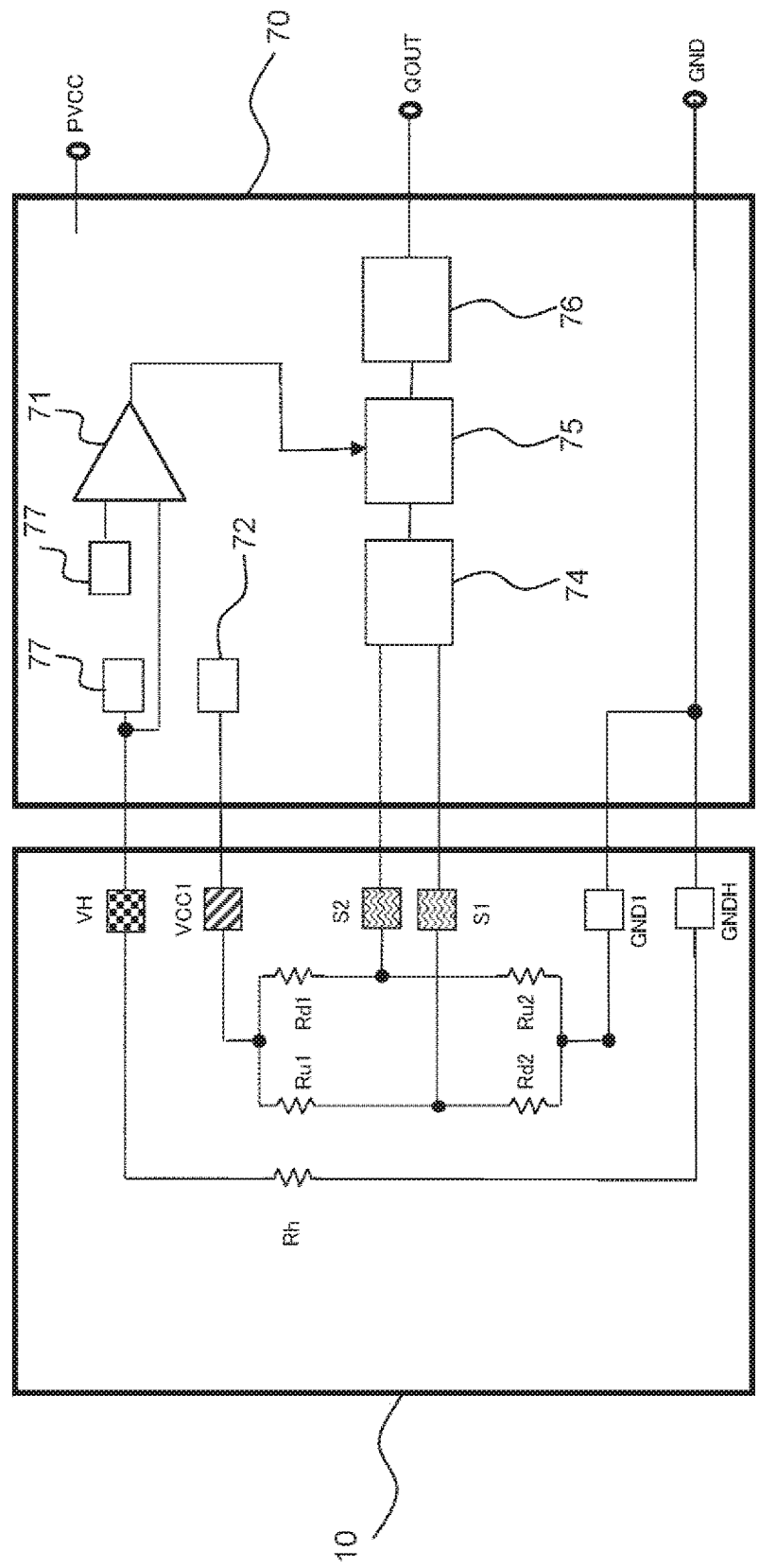
FIG. 13 is an illustration of an embodiment of the thermal flow rate sensor according to the present invention.

Next, a clearer self-diagnosis method using the element configuration of the first embodiment and the LSI of the drive element will be explained using FIG. 13 and FIG. 14. FIG. 13 presents a simplified signal diagram when the element 10 and the LSI 70 are connected. The output voltage (S1-S2) of the element is input into an A/D converter inside the LSI and converted to a digital value. After that, calculation processing is carried out at a DSP, and the digital value is converted to a desired output value at an output conversion circuit and output as an output QOUT of the thermal flow rate sensor.

Figure 14:
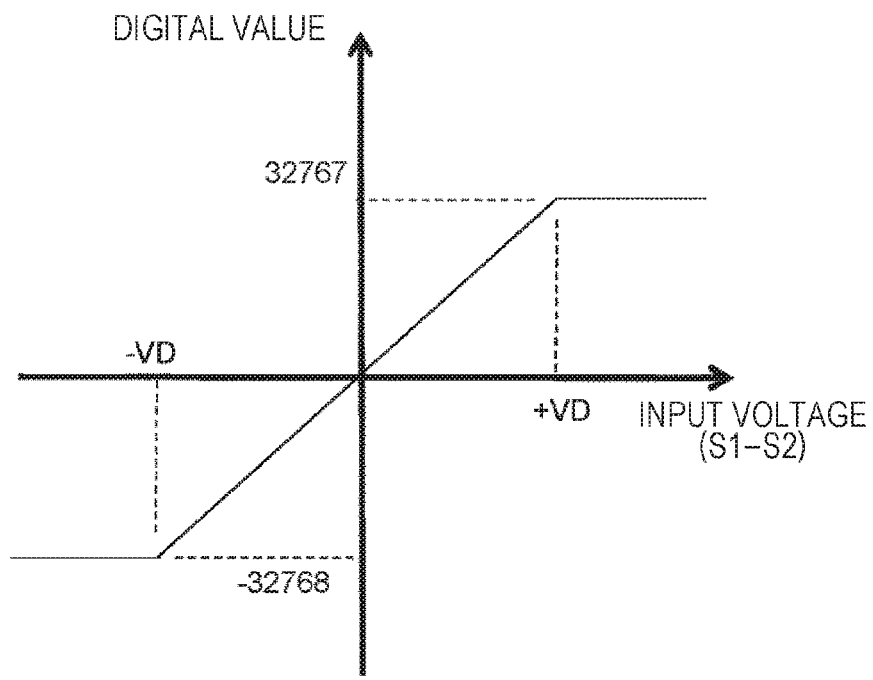
FIG. 14 is an illustration of an embodiment of the thermal flow rate sensor according to the present invention.

Now, a general property of an A/D converter is presented in FIG. 14. While an input is linearly converted to a digital value in a specific input range (−VD to +VD), an input other than that is fixed to a HIGH level and a LOW level. Since in FIG. 14, a 16-bit A/D converter is assumed, the HIGH level is 32767 and the LOW level is −32768. However, taking a product variation into consideration, the voltage VD, which is 32767, has a slight variation, and hence the voltage value of a digital value is different for each product. On the other hand, since an input of VD or greater is always fixed to the HIGH level, the digital value becomes constant regardless of the product.

Now, (S1-S2), which is an input voltage of the A/D converter, is defined as S1=OUT1 and S2=OUT2 and an electrical potential (VCC1 in FIG. 1) of a pad provided between the electrode pads of S1 and S2 is defined as OUT3, and, when a short circuit occurs between the VCC1 electrode pad and either of the electrode pads of both ends, each input becomes either OUT3−OUT2 or OUT1−OUT3. If the absolute value of the input value at this time is greater than a value of the VD described above, the input is always fixed to the HIGH level or the LOW level.

In other words, by setting the OUT3 electrical potential in which |OUT3−OUT1|>|VD| and |OUT3−OUT2|>|VD| are constantly true regardless of the presence of air flow and change in environment and temperature, an identical self-diagnosis is made possible because an input is always fixed to the HIGH level or the LOW level even if a short circuit occurs between adjacent pads regardless of the product performance variation.

In an example of product, when an output conversion circuit that outputs 5 V at the time of HIGH level and 0 V at the time of LOW level is designed, QOUT is always 5 V or 0 V at the time of short circuit described above. On the other hand, in case of a normal use, it is commonly practiced that the input voltage is set so that it falls into a linear region of the A/D converter and set so that a slight margin from the saturation region is given (input range in which the digital value becomes about −20000 to 20000 at the normal time, for instance), and therefore 5 V or 0 V is not output at the normal time. Due to this, a clearer self-diagnosis whether it is normal or abnormal is made possible on the ECU side regardless of product variation of the thermal flow rate sensor.

In addition, while in the first embodiment, VH and VCC1 are power supplies with the same electrical potential, they may be set with different electrical potentials depending on the product. In that case, it is necessary to diagnose a short circuit occurring between VH and VCC1. As for this, two source circuits 77 as presented in FIG. 13 with the same electrical potential are formed and compared using an operational amplifier, and thus short circuit detection is easily made possible.

Third Embodiment

A configuration of the present invention with a heater drive method different from that in the first embodiment will next be explained using FIG. 15, FIG. 16, and FIG. 17.

Figure 15:
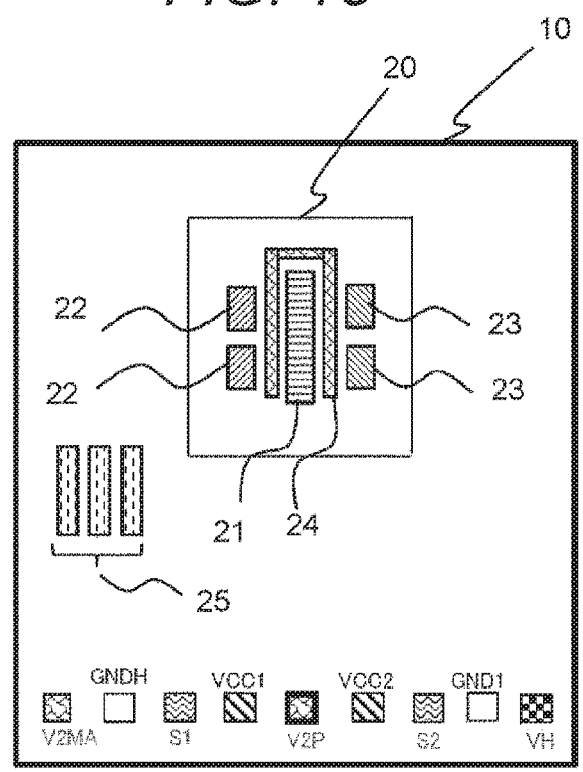
FIG. 15 is an illustration of an embodiment of the thermal flow rate sensor according to the present invention.
Figure 16:
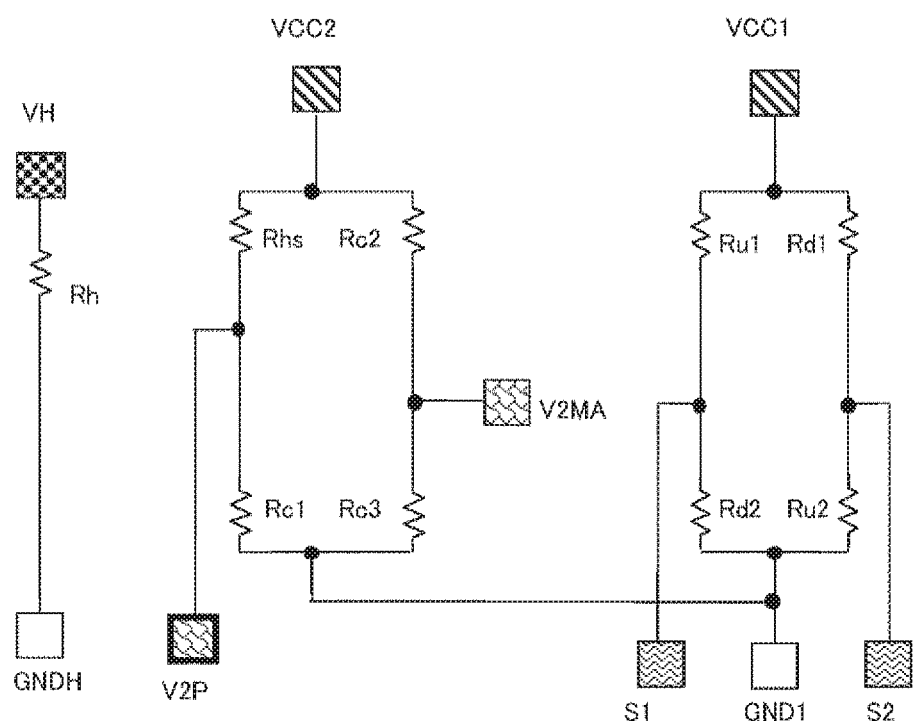
FIG. 16 is an illustration of an embodiment of the thermal flow rate sensor according to the present invention.
Figure 17:
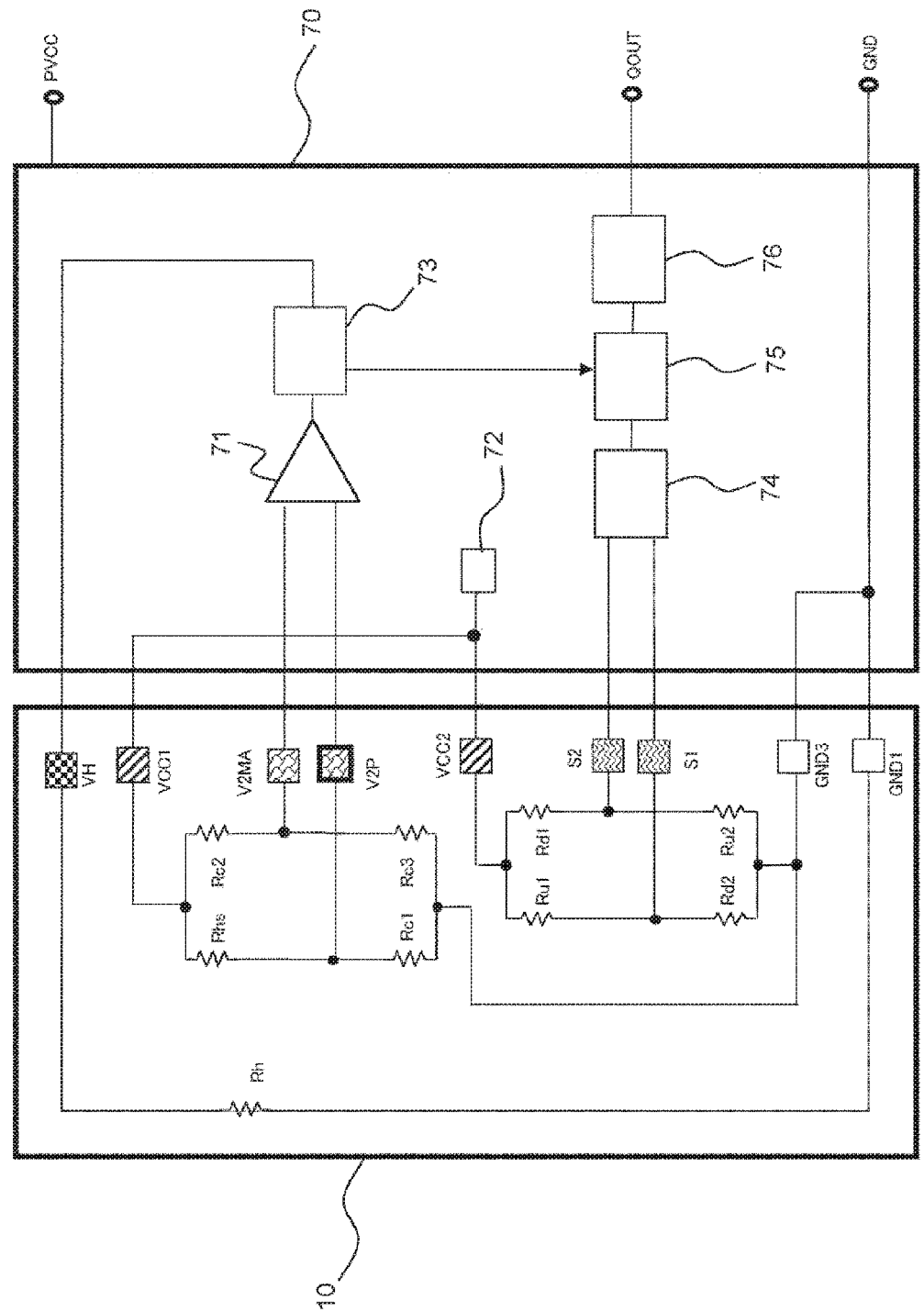
FIG. 17 is an illustration of an embodiment of the thermal flow rate sensor according to the present invention.

FIG. 16 presents a circuit diagram of the air flow rate element 10, and FIG. 17 presents a signal diagram in a case where it is connected with the drive element LSI 70. In this circuit configuration, a bridge with which temperature of heat applied by the heater is controlled is added to the circuit configuration of the first embodiment. In addition, an arrangement of each resistor is presented in FIG. 15. In addition to the configuration of the first embodiment, a heater temperature-sensitive resistor (Rhs) 24 is arranged on the periphery of a heater 21, and due to this, the temperature of Rhs also rises by heat generated by the heater. Following this, the temperature of Rhs resistance rises and a V2P terminal and a V2MA terminal of the bridge circuit are heated until they become the same electrical potential. Due to this, the temperature of the heater is controlled so that it becomes a certain temperature. Fixed resistances (Rc1, Rc2, and Rc3) 26 of the heater temperature control bridge are formed not on the diaphragm section but on the silicon substrate.

In addition, FIG. 15 presents an arrangement of the electrode pad of each electrical potential presented in FIG. 16. These electrode pads are arranged so that the electrical potential of the pads adjacent to each of the electrode pads (S1 and S2) through which the flow rate signal is output, the electrode pads (V2P and V2MA) through which the midpoint potential of the bridge circuit that controls the temperature of the heater is output, and the electrode pad (VH) through which the heater power source is output become the electric power source potentials (VCC1 and VC2) of the bridge circuit, its ground potential (GND1), or the ground potential (GNDH) of the heater. The difference in the idea from the first embodiment lies in that the heater power source VH is handled as a midpoint potential. In the first embodiment, VH is driven on constant voltage by the LSI fixed power source. In the present embodiment, on the other hand, VH is a feedback circuit and changes due to the presence of air flow and temperature change, and thus VH needs to be handled as a midpoint potential similarly with S1, S2, and the like.

At first, at the electrode pads (S1 and S2) through which a flow rate signal is output, adjacent pads are arranged with the identical condition to that of the first embodiment, and therefore a self-diagnosis is made possible in all the short circuit modes.

Next, at the electrode pads (V2P and V2MA) through which the midpoint potential of the bridge circuit that controls the temperature of the heater is output, the condition of the electrical potential of the adjacent electrode pad is identical to the condition of the electrode pad through which the flow rate signal described above is output but output change at the time of short circuit is different. When a short circuit occurs between the midpoint potential of the bridge circuit that controls the temperature of the heater and the bridge power-source voltage or the ground potential, an input of an operational amplifier presented in FIG. 17 is in a state with a constant offset, and hence VH, which is an output voltage of the operational amplifier, constantly keeps the HIGH level. By monitoring this state using a heater voltage judgment circuit 73, the short circuit described above can be detected. An example of detection method is to store the VH voltages in a memory in the LSI for a certain period of time, to judge that it is abnormality if all of the VH voltages are the HIGH level (or the LOW level) for a certain period of time, and to output a self-diagnosis output signal.

Next, at the electrode pad (VH) through which the heater power source is output, since the adjacent pad has a ground potential in FIG. 15, in case of short circuit, by monitoring it using the heater voltage judgment circuit 73 described above, the short circuit described above can be detected.

In a case where the adjacent pad has the bridge circuit electric power source potential (VCC1 or VCC2), if the electrical potential has the same electrical potential (let it be 5 V in this case) as that of a power source PVCC that is supplied to the thermal flow rate sensor, VH constantly keeps 5 V (HIGH) in case of short circuit, and hence by monitoring it using the heater voltage judgment circuit 73 described above, the short circuit described above can be detected. On the other hand, in a case where the electrical potential is driven on an electrical potential that is lower than PVCC, there is a case where the heater voltage judgment circuit 73 described above is not capable of detecting the short circuit. In that case, the arrangement may be made so that the electrical potential of the electrode pad adjacent to VH becomes the ground potential as in the present embodiment.

Figure 21:
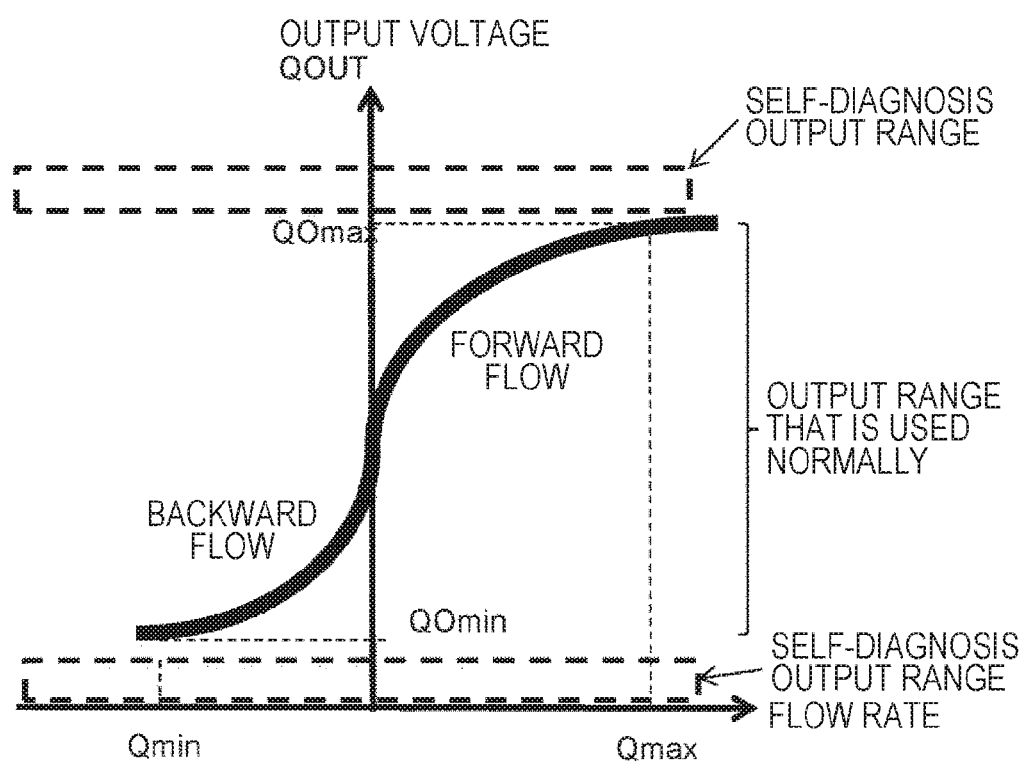
FIG. 21 is an illustration of an embodiment of the thermal flow rate sensor according to the present invention.

In a case where the form of the output QOUT of the thermal flow rate sensor is a voltage output or a frequency output, the self-diagnosis output signal described above is set as presented in FIG. 21, so that it is outside the output range that is used normally, and thus a diagnose can be carried out most easily. Using a specific setting method in which when the heater voltage judgment circuit described above detects an abnormality, the signal is input to the DSP and the digital value of the flow rate output signal is forcibly replaced with 32767 or −32768, QOUT falls into outside the output range that is used normally similarly to the first embodiment.

In addition, as for another self-diagnosis output signal, in a case where the form of the output QOUT of the thermal flow rate sensor is a digital output such as SENT and LIN, a failure flag is allocated to a specific bit and output, and thus a diagnose can be carried out most easily. If an abnormality flag is put up to even only one of the many bits that are transmitted, the ECU can recognize that an abnormality has occurred in the thermal flow rate sensor. The bit described above may be set in consistency with the ECU on an output signal reception side.

As seen above, in the present third embodiment, a thermal flow rate sensor that is capable of self-diagnosis in all the cases where a short circuit occurs between adjacent electrode pads can be provided.

In addition, regardless of the circuit diagram of the present third embodiment, as long as at least the pads described above are provided, an advantageous effect of a self-diagnosis of the thermal flow rate sensor can be achieved if the arrangement relationship of the electrode pads meets the conditions described above.

Fourth Embodiment

A configuration of the present invention with the heater drive method different from that in the third embodiment will next be explained using FIG. 18, FIG. 19, and FIG. 20.

Figure 19:
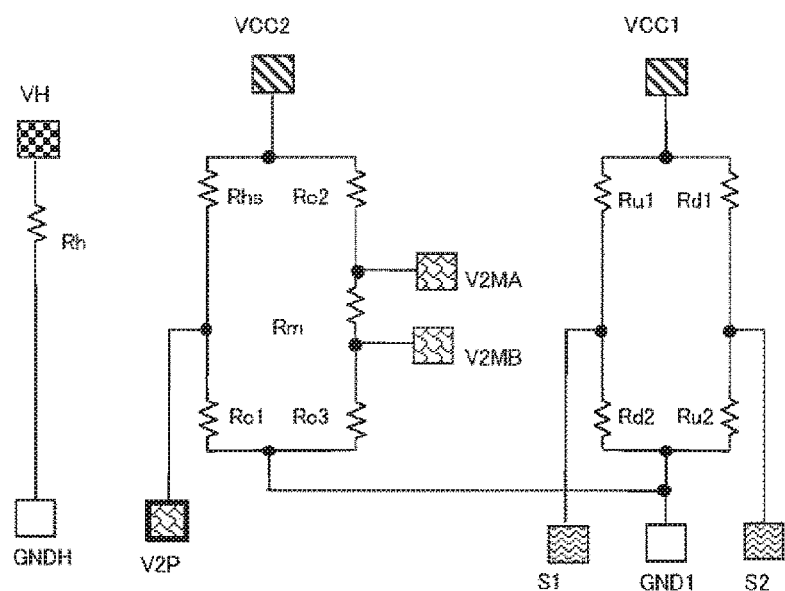
FIG. 19 is an illustration of an embodiment of the thermal flow rate sensor according to the present invention.
Figure 20:
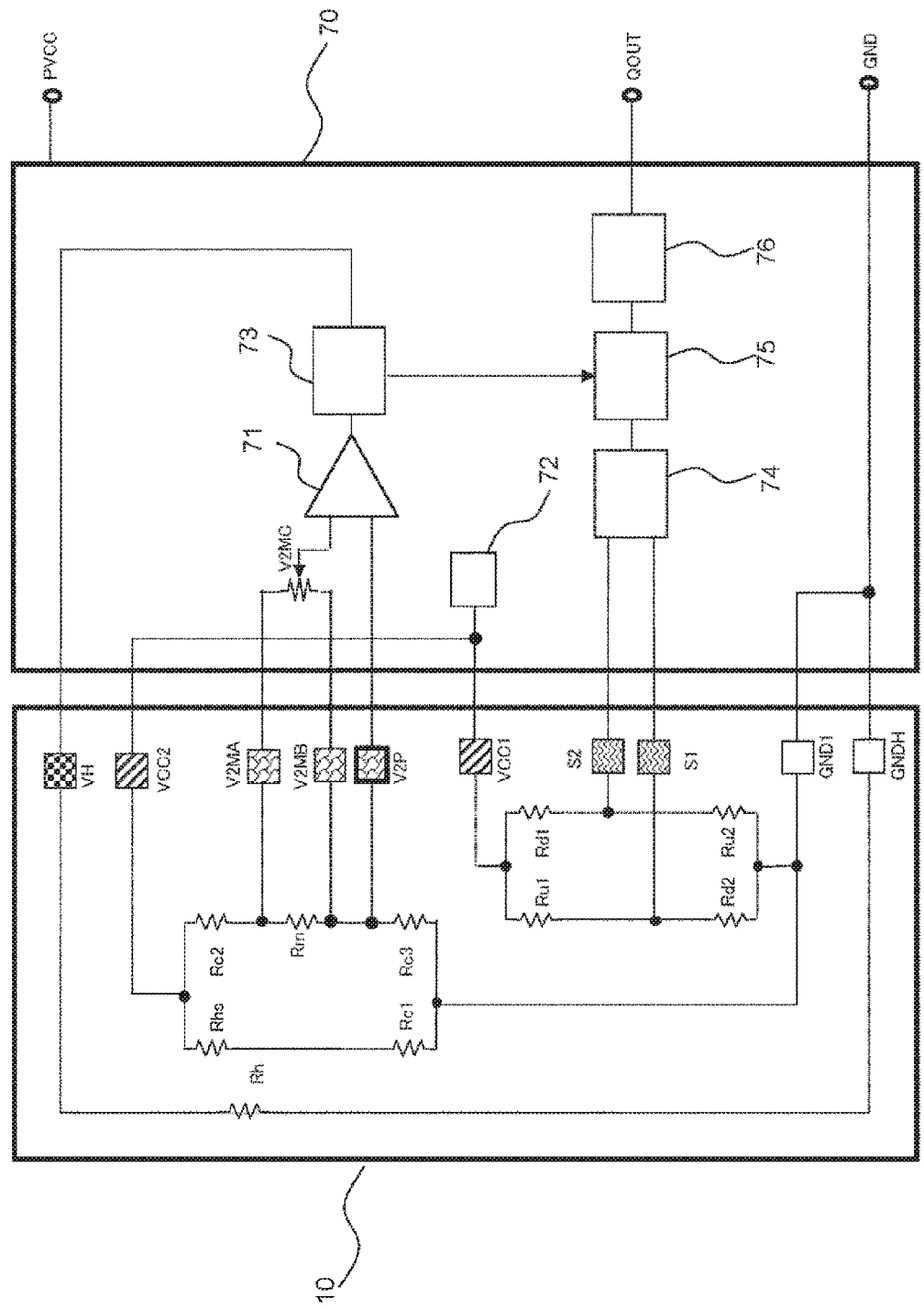
FIG. 20 is an illustration of an embodiment of the thermal flow rate sensor according to the present invention.

FIG. 19 presents a circuit diagram of the air flow rate element 10, and FIG. 20 presents a signal diagram in a case where it is connected with the drive element LSI 70. In this circuit configuration, a resistance (Rm) 26 for adjustment with which temperature of heat applied by the heater is controlled more accurately is added to the circuit configuration of the third embodiment. Following that, also on the LSI side, a circuit is formed in which an arbitrary voltage value V2MC can be selected from the electrical potential of both ends of the resistance for adjustment described above. Due to this, while V2MA is the only choice of the adjustment electrical potential in the third embodiment, the temperature of heat applied by the heater can be controlled more accurately because the adjustment electrical potential can be arbitrarily selected in a certain range.

Figure 18:
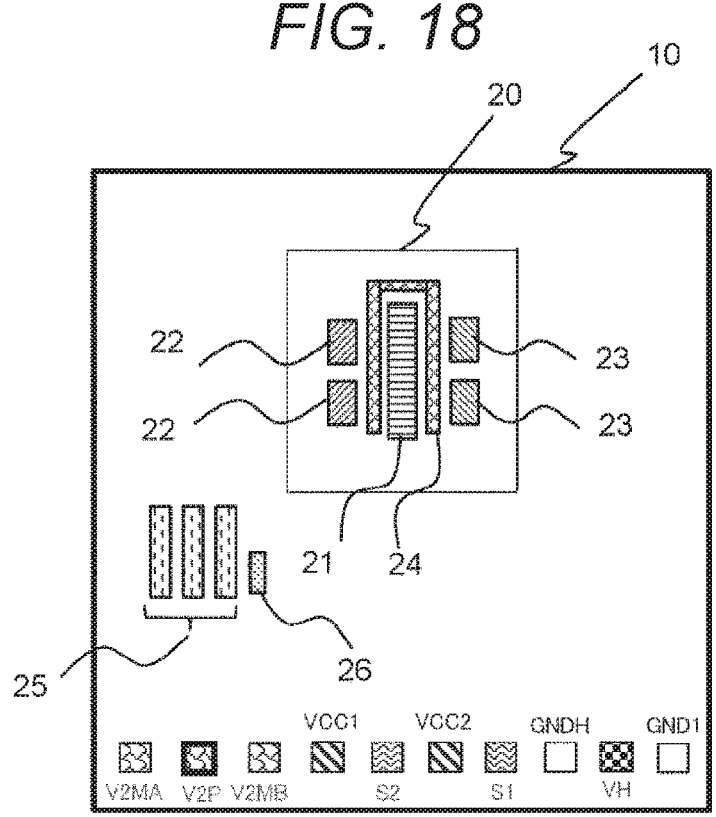
FIG. 18 is an illustration of an embodiment of the thermal flow rate sensor according to the present invention.

In addition, FIG. 18 presents an arrangement of the electrode pad 30 of each electrical potential presented in FIG. 19. These electrode pads are arranged so that the electrical potential of the pads adjacent to each of the electrode pads (S1 and S2) through which the flow rate signal is output and the electrode pad (VH) through which the heater power source is output is the electric power source potentials (VCC1 and VCC2) of the bridge circuit, its ground potential (GND1), or the ground potential (GNDH)

of the heater, and the electrode pads (V2MA and V2MB) of the both terminal electrical potentials of the resistance for adjustment described above are not adjacent.

Figure 8:
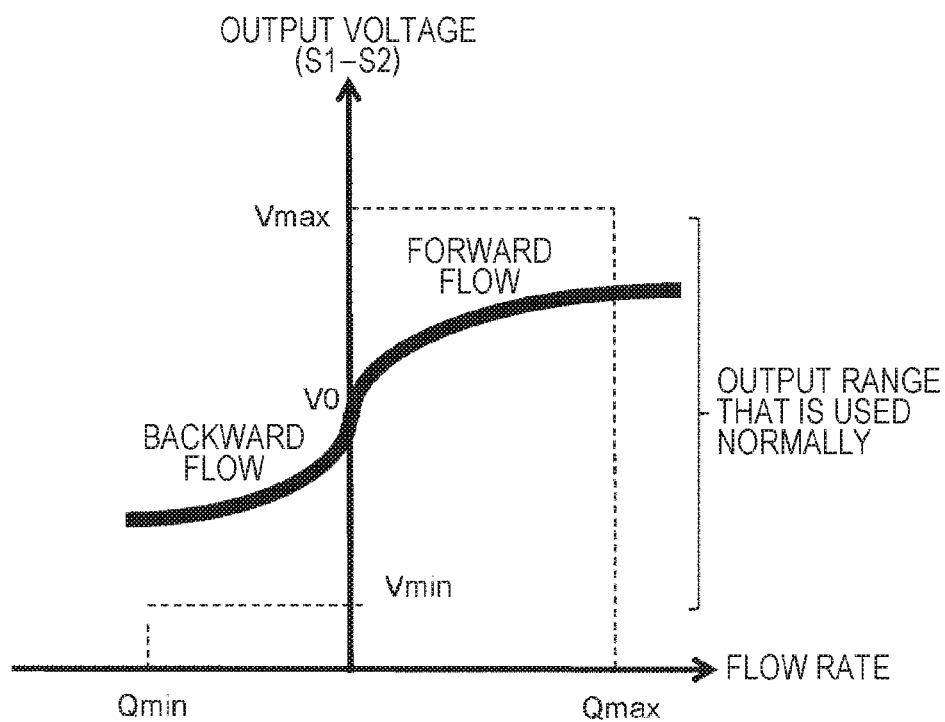
FIG. 8 is an illustration of an embodiment of a conventional thermal flow rate sensor.
Figure 9:
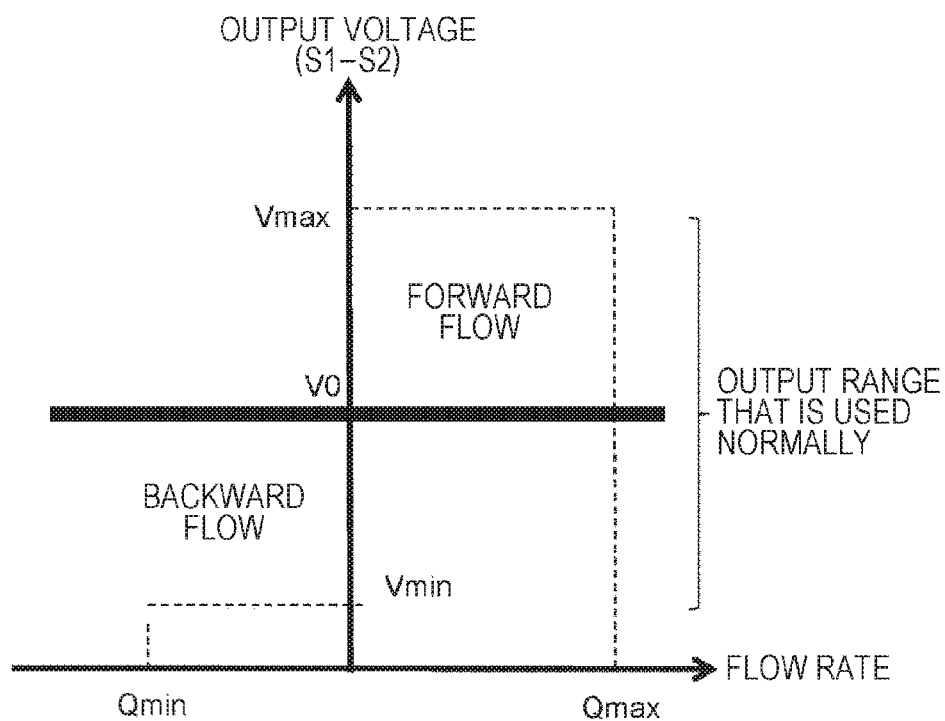
FIG. 9 is an illustration of an embodiment of a conventional thermal flow rate sensor.
Figure 10:
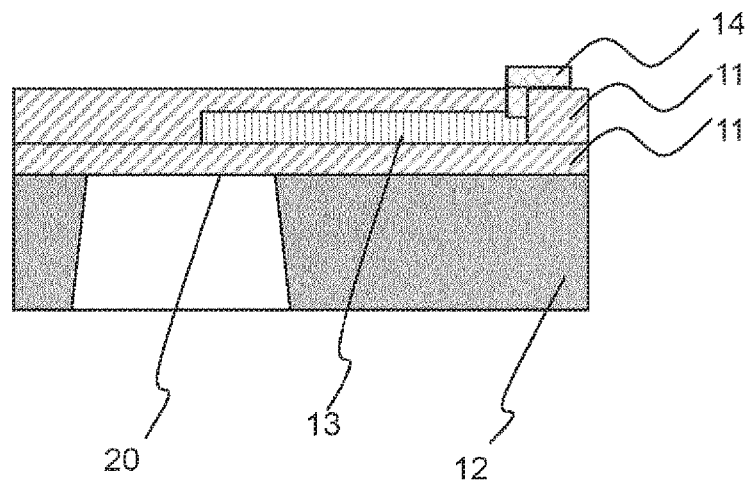
FIG. 10 is a cross-section view of the air flow rate detection element.

The difference in the idea from the third embodiment lies in that the short circuit between the midpoint potential (V2P) on the heater temperature-sensitive resistor side of the bridge circuit and the electrical potentials (V2MA and V2MB) of the both terminals of the resistance for adjustment described above is not limited. In a case where a short circuit occurs between V2MA and V2MB, while a relationship of V2MA>V2MC>V2MB is always true before the short circuit occurs, a relationship of V2MA=V2MC=V2MB is true after the short circuit occurs. As a result, V2MC, which is an input of an operational amplifier 71, changes. In that case, the temperature of heat applied by the heater changes and hence the output property becomes as the one presented in FIG. 8. In this case, abnormality cannot be detected because it is not an abnormal circuit drive also on the LSI side in addition to the fact that a self-diagnosis cannot be carried out from the output property. Accordingly, a pad arrangement needs to be configured so that a short circuit does not occur between the electrical potentials of the both terminals of the resistance for adjustment described above.

On the other hand, in a case where a short circuit occurs between V2P and V2MA (or V2MB), there is a relationship of V2MA>V2MC>V2MB similarly to the above, and hence V2P and V2MC do not become the same electrical potential. Due to this, the output (VH) of the operational amplifier is constantly fixed to HIGH, and thus, similarly to the third embodiment, by monitoring it using the heater voltage judgment circuit 73, the short circuit described above can be detected.

As for the electrode pads (S1 and S2) through which another flow rate signal is output and the electrode pad (VH) through which a heater power source is output, adjacent pads are arranged with the identical condition to that of the third embodiment, and therefore a self-diagnosis is made possible in all the short circuit modes.

As seen above, in the present fourth embodiment, a thermal flow rate sensor that is capable of self-diagnosis in all the cases where a short circuit occurs between adjacent electrode pads can be provided.

In addition, regardless of the circuit diagram of the present fourth embodiment, as long as at least the pads described above are provided, an advantageous effect of a self-diagnosis of the thermal flow rate sensor can be achieved if the arrangement relationship of the electrode pads meets the conditions described above.

REFERENCE SIGNS LIST 10 air flow rate detection element
11 insulating oxide film
12 silicon substrate
13 resistance wiring film
14 electrode wiring layer
20 diaphragm
21 heat resistor (heater); Rh
22 upstream side temperature resistor; Ru
23 downstream side temperature resistor: Rd
24 heater temperature-sensitive resistor: Rhs
25 heater temperature control bridge configuration resistances; Rc1, Rc2, and Rc3
26 resistor for adjustment: Rm
30 electrode pad
40 air intake duct
50 thermal flow rate sensor
60 ceramic substrate
65 electrical wiring layer of ceramic substrate
70 LSI
71 operational amplifier
72 bridge power supply circuit
73 heater voltage judgment circuit
74 A/D converter
75 DSP
76 output conversion circuit
77 heater power supply circuit
80 aluminium wire
90 gold wire
100 resin seal region
101 void in resin

The invention claimed is:

1. A thermal flow rate sensor that is provided with a plurality of electrode pads for electrical conduction with an outside and includes a semiconductor element that detects a flow rate, wherein an electrode pad of the plurality of the electrode pads that has an electrical potential outside of an output range used at a time of a flow rate detection is adjacent to an electrode pad of the plurality of electrode pads through which a flow rate signal is output, the semiconductor element is provided with at least one or more heat resistors, the upstream and downstream of the semiconductor element are provided with a temperature measuring resistor for detecting a temperature difference, a semiconductor circuit element that drives the heat resistor is electrically connected, and a flow rate is detected by detecting a temperature of the upstream and downstream, the semiconductor circuit element includes a circuit in which a voltage value that is output by temperature change in the upstream and downstream is converted to a digital value at an analog/digital converted circuit, and where a voltage range of the analog/digital converted circuit is defined as −VD and +VD, a flow rate output value that is output by temperature change in the upstream and downstream is defined as OUT1 and OUT2, and an electrical potential of an electrode pad of the plurality of electrode pads provided between the electrode pads for the flow rate signal is OUT3, |OUT3−OUT1|>|VD| and |OUT3−OUT2|>|VD| are always true regardless of a presence of air flow and environment temperature change.

2. The thermal air flow rate sensor according to claim 1, comprising:
   a short circuit detection method of a power supply circuit of the semiconductor circuit element.

3. The thermal air flow rate sensor according to claim 1, comprising: a bridge circuit for controlling heating temperature of the heat resistor is provided, and at least two or more electrode pads for removing a midpoint potential of the bridge circuit are provided, wherein the plurality of electrode pads are arranged so that an electrical potential of electrode pads adjacent to each of electrode pads through which the flow rate signal is output, electrode pads through which the midpoint potential of the bridge circuit that controls temperature of the heat resistor is output, and an electrode pad through which a power source of the heat resistor is output becomes an electric power source potential of the bridge circuit, a ground potential, or a ground potential of the heat resistor.

4. The thermal air flow rate sensor according to claim 1, comprising: a bridge circuit for controlling heating temperature of the heat resistor is provided, wherein the bridge circuit is provided with a resistance for adjustment to adjust in detail heating temperature of the heat resistor, at least one or more electrode pads for removing a midpoint potential of a temperature-sensitive resistor side of the heat resistor of the bridge circuit are provided and at least two or more electrode pads for removing an electrical potential of both terminals of the resistance for adjustment are provided, and the plurality of electrode pads are arranged so that an electrical potential of electrode pads adjacent to each of electrode pads through which the flow rate signal is output and an electrode pad through which a power source of the heat resistor is output become an electric power source potential of the bridge circuit, a ground potential, or a ground potential of the heat resistor, and electrode pads of both terminal electrical potentials of the resistance for adjustment are not adjacent to each other.

5. The thermal air flow rate sensor according to claim 1, wherein in a case where an output form of a thermal air flow rate sensor is a voltage output or a frequency output, the failure diagnose signal is set to an outside of an output range that is used normally.

6. The thermal air flow rate sensor according to claim 1, wherein in a case where an output form of a thermal air flow rate sensor is a digital communication including at least one of a SENT (Single Edge Nibble Transmission) and a LIN (Local Interconnect Network), a failure flag is allocated to a specific bit and transmitted.

* * * * *